United States Patent Office 2,892,960
Patented June 30, 1959

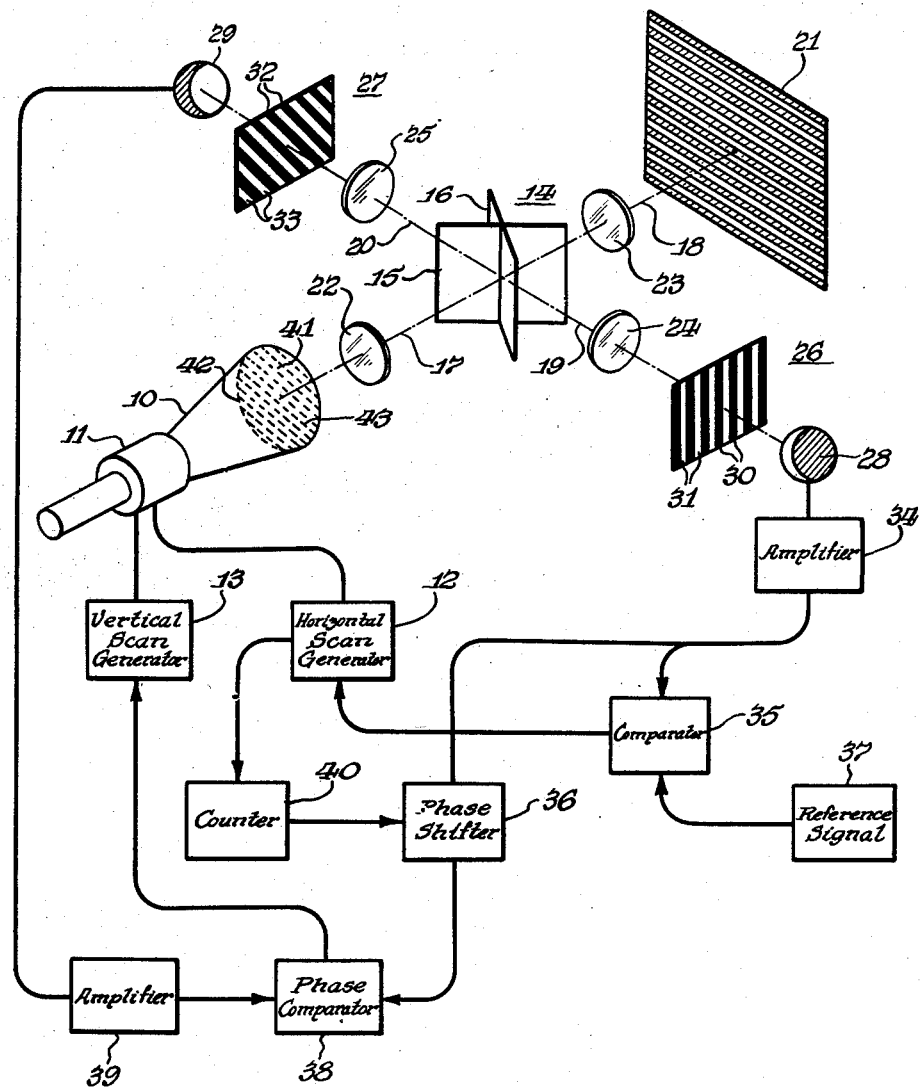

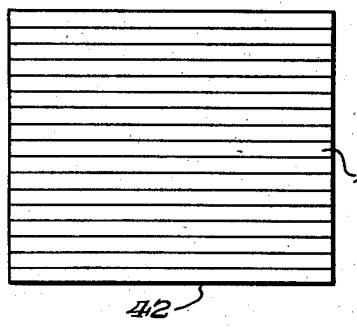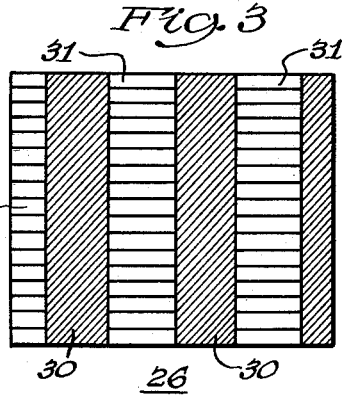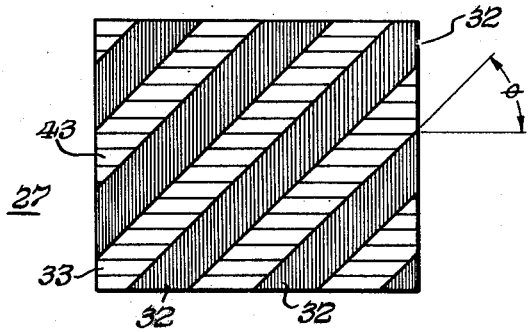

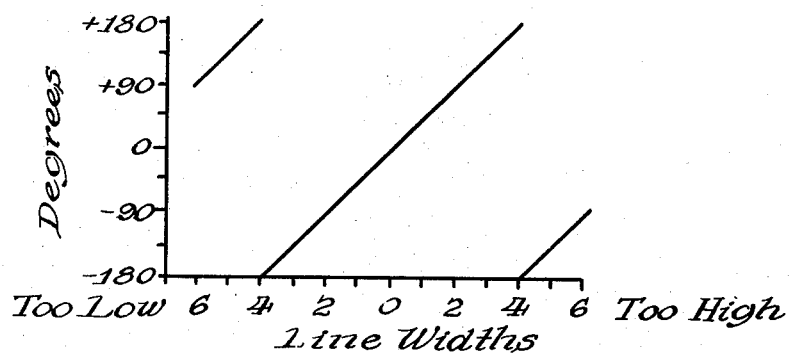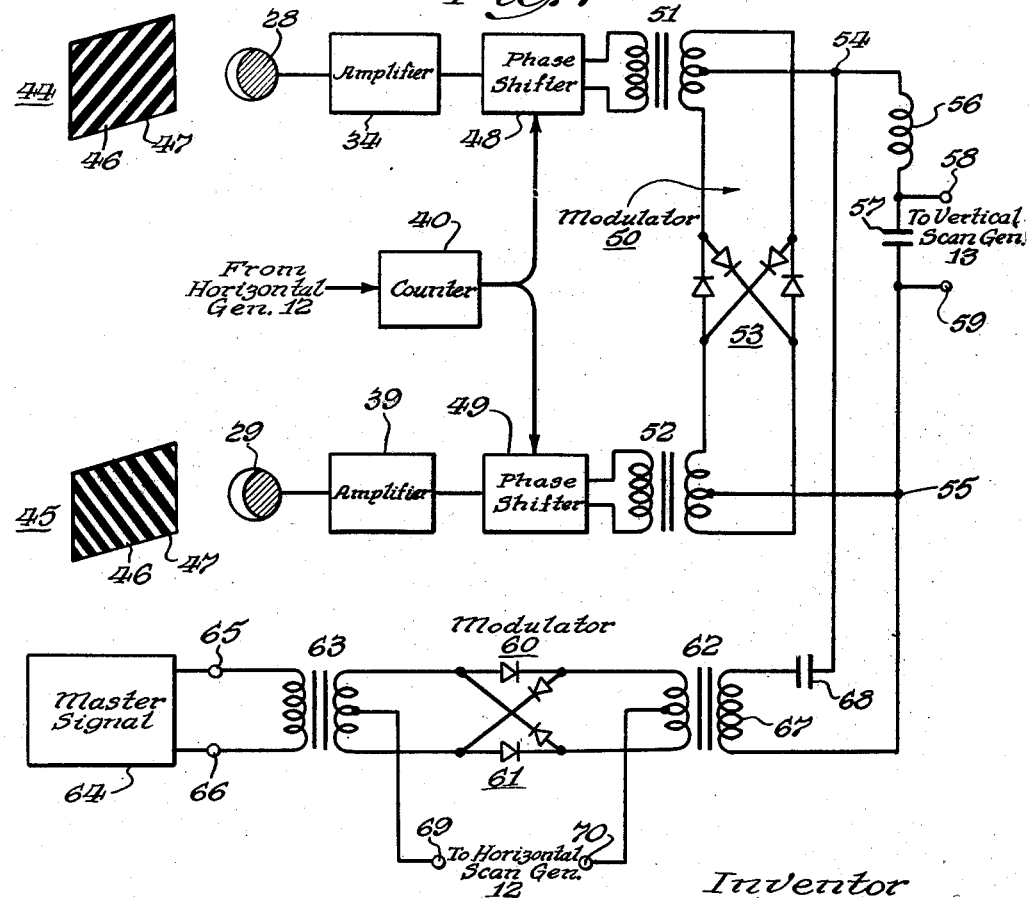

2,892,960

SCANNING CONTROL SYSTEM

Thomas Cayton Nuttall, Croydon, England, assignor to Rank Cintel Limited, a British company Application June 20, 1957, Serial No. 667,006

Claims priority, application Great Britain June 22, 1956

9 Claims. (Cl. 315—10)

This invention relates to improvements in methods of and apparatus for controlling line-by-line scanning processes.

A previously-proposed method for ensuring that a beam of radiant energy shall be traversed at a constant linear velocity along each line of an area which is to be scanned involves providing the scanned area with a succession of lines perpendicular to the direction of line scanning. As a result of the impact of the scanning beam on these lines a signal is derived which contains a component at a frequency related to the linear speed of the scanning beam. This signal is then compared in phase with a signal of accurately constant frequency and the phase difference between the two signals is used to control the speed of scanning.

It has also been previously proposed, in British patent specification No. 641,936, to provide apparatus in which the position of a scanning beam or a scanning spot is controlled by comparing the pattern of lines formed by the scanning spot with a separate master pattern of lines and correcting any divergence of the pattern from the master. The signals derived from this comparison comprised a varying electrical direct current or voltage, so that the accuracy of the system depended largely upon the absolute sensitivity of the sensing which detected the departure of the pattern from the desired form.

It is a primary object of this invention to provide an improved scanning control system in which developed signals indicative of the departure of the scanning beam from desired scanning coordinates comprise variations in phase or frequency.

It is an object of the subject invention to provide a scanning control system which precludes the dependence of scanning accuracy upon the absolute sensitivity of the error sensing apparatus.

It is a further object of this invention to provide apparatus for ensuring that a scanning beam is traversed over desired scanning coordinates at a predetermined linear velocity and along a predetermined linear path.

In accordance with the invention, a scanning control system comprises means for generating a beam of radiant energy which is subjected to a deflection system responsive to a first scanning signal for displacing the beam in a first coordinate scanning direction at a predetermined first scanning frequency and responsive to a second scanning signal for displacing the beam in a second coordinate direction at a predetermined second scanning frequency. First and second scanning signal generators are coupled to the aforementioned deflection system for initiating coordinate scanning of the beam. A beam splitter is provided for separating the beam into a primary beam and a pair of divergent secondary beams. First and second field elements are interposed in the paths of the secondary beams and each comprise a plurality of spaced opaque strips with intervening translucent areas of equal width measured in the first coordinate direction, the opaque strips of the second field element are obliquely oriented relative to the strips of the first field element.

First and second pick-up devices are associated, respectively, with the first and second field elements. The pick-up devices respond to the secondary beam components which are translated through the translucent areas of the field elements and generate respective first and second output signals. A source of reference signal proportional to the predetermined first scanning frequency is provided. Means are coupled to at least one of the pick-up devices and to the reference signal source for developing a first control signal which is representative of deviations of the scansion of the beam in the first coordinate direction from the predetermined first scanning frequency. A phase comparator is coupled to the pick-up devices and is responsive to phase variations between the aforementioned first and second output signals for developing a second control signal which is representative of deviations of the scansion of the beam in the second coordinate direction from the predetermined second scanning frequency. Finally, means are provided for applying the first and second control signals to the first and second scanning signal generators, respectively, to correct deviations of the scansion in both of the coordinate directions.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1 is a perspective view, partly in schematic representation, of a principal embodiment of the invention;

Figure 2 is an elevation view of a raster generated by the apparatus of Figure 1;

Figure 3 is an elevation view of a field element associated with the apparatus shown in Figure 1;

Figure 4 is an elevation view of a second field element associated with the apparatus shown in Figure 1;

Figure 5 is a series of wave forms useful in illustrating the operation of the apparatus shown in Figure 1;

Figure 6 is a graphical diagram utilized in describing the operation of the apparatus shown in Figure 1; and Figure 7 is a schematic representation of an alternate embodiment of the invention.

Figure 1 shows a cathode-ray tube 10 for generating a beam of radiant energy, the projected image of which can comprise a flying spot. Cathode-ray tube 10 is provided with a conventional electromagnetic deflection system 11 which is energized by a horizontal scan generator 12 and a vertical scan generator 13 to display upon the luminescent screen 41 a raster 42 comprising the parallel lines 43. A beam splitter 14 consisting of the crossed part-silvered mirrors 15, 16 intercepts the image of the generated beam of cathode-ray tube 10 to produce a primary beam having the path defined by the broken lines 17, 18 and a pair of secondary beams having the trajectories 19, 20. The primary beam is projected upon a utilization area 21 by means of an optical system represented as consisting of the pair of single lenses 22, 23. A second pair of lenses 24, 25 intercept the trajectories 19, 20 and focus the secondary beams upon the field elements 26, 27, respectively. A pair of photocells 28, 29 comprising pick-up devices are disposed adjacent to and observe respective field elements 26, 27.

Field element 26 comprises the parallel opaque strips 30 advantageously made equal in width to the intervening translucent areas 31 and perpendicularly disposed to the direction of line scanning. Field element 27 includes the parallel opaque strips 32 also of equal width to the intervening translucent areas 33, but inclined to the direction of line scanning at an angle less than 90°. In order that the widths of strips 32 and areas 33 of field 27, as measured in the direction of line scanning, be equal to the widths of strips 30 and areas 31 of field 26, the widths of strips 32 of field 27 as measured normal to their parallel bounds is preferably equal to the width of strips 30 of field 26 multiplied by the cosine of the angle defined by the intersection of strips 32 with the direction of line scanning.

Photocell 28 is connected to an amplifier 34 which in turn is coupled to a comparator 35 and a phase shifter 36. Comparator 35 is further provided with a reference signal 37. The output of comparator 35 is returned to the horizontal scanning generator 12.

Photocell 29 is coupled to a phase comparator 38 through an amplifier 39. A counter unit 40 driven by horizontal scan generator 12 is coupled to phase comparator 38 through phase shifter 36. The output of phase comparator 38 is coupled to vertical scan generator 13.

Figure 2 illustrates a portion of the raster 42 traced on luminescent screen 41 of cathode-ray tube 10. An image of raster 42 is projected upon utilization area 21 for whatever purpose it is required. Raster 42 is also imaged upon field 26 as shown in Figure 3 which shows a portion of field 26 as "seen" by photocell 28. As described above field 26 consists of opaque strips 30 and intervening areas 31 of equal width through which an image of a particular line 43 of raster 42 appears.

Figure 4 illustrates one possible configuration of a portion of the field 27 utilized in the principal embodiment depicted in Figure 1. Field 27 is shown as comprising inclined opaque strips 32 and the intervening areas 33 of equal width which determine in conjunction with the direction of line scanning, the angle θ. It is possibly most apparent in Figures 3 and 4 that the widths of the strips and intervening areas, in the direction of line scanning, are purposely equated in order that a signal derived from photocells 28 and 29 will have the same periodicity. Where the magnification of lenses 9 and 10 by which raster 42 is projected upon fields 26 and 27 are equal, it is necessary that the widths of strips 32 of field 27 shall be related to the widths of strips 30 of field 26 by the cosine function adverted to above. Where the magnification of lenses 24 and 25 differ, an appropriate weighting factor must be introduced.

Figure 5 illustrates a group of wave forms characterizing various signals associated with the operation of the principal embodiment. The wave form 37, of course, is representative of reference signal 37, which can be sinusoidal. Wave forms 28A and 29A comprise, respectively, output signals generated by photocells 28, 29 during the scanning of the particular line 43 of raster 42.

Figure 6 comprises a graph representative of the latitude of line displacement error over which the subject scanning control system is operative to restore correct line scansion.

Figure 7 which shows alternative apparatus for practising the invention utilizes substantial portions common to the principal embodiment of Figure 1 and in the interest of conserving space are not reproduced. Specifically, and by way of difference, the alternate embodiment of Figure 7 utilizes a pair of field elements 44, 45 each comprised of the strips 47 made equal to the intervening translucent areas 46 and inclined to the direction of line scanning. The strips and areas associated with the particular fields 44 and 45, are inclined, respectively, at equal but opposite angles to the direction of line scanning. The field elements 44, 45 are "observed" by photocells 28, 29 which in turn are coupled to the amplifiers 34, 39 respectively. The outputs from amplifiers 34, 39 are fed to the respective phase shifter devices 48, 49 which are in turn actuated by counter 40. A ring modulator circuit 50 comprises the input transformers 51, 52 connected, respectively, to phase shifters 48, 49, and a diode ring 53. The output of modulator 50 is referred to the terminals 54, 55. A low-pass filter comprises an inductor 56 and a capacitor 57 having a pair of output terminals 58, 59 connected thereacross.

A second ring modulator 60 comprises the diode ring 61 and a pair of oppositely disposed transformers 62, 63. A master signal 64 is availed to the input terminals 65, 66 of transformer 63. A high-pass filter may conveniently include an inductor 67 formed by the primary winding of transformer 62 and the capacitor 68. Modulator 60 is terminated by output terminals 69, 70.

In operation a signal generated in photocell 28 consists of the approximate square wave 28A, the periodicity of which depends upon the speed with which an image of the scanning beam sweeps over field element 26. This signal is conventionally amplified in a suitable amplifier 34. Signal 28A is then applied to the comparator 35 in which it is compared in frequency and phase with reference signal 37. As a result of this comparison, comparator 35 yields a control signal which is applied to horizontal scan generator 12 in such a manner as to increase the sweep speed if the output signal 28A from cell 28 lags with respect to reference signal 37 or to reduce the sweep speed if signal 28A leads in phase.

The system as thus far described differs from what has previously been practiced only in the separation of field 26 from the utilization scanned area 21.

In accordance with an aspect of the present invention, however, cell 29 in conjunction with field 27, generates the signal 29A similar to that derived from cell 28 but differing in phase with respect to signal 28A according to the position of the line being scanned. Signal 29A from cell 29 is suitably amplified by amplifier 39 and is then applied to phase comparator 38 in which it is compared in phase with a signal derived from photocell 28 by way of phase shifter 36, the function of which is described below.

Phase comparator 38 yields a signal the magnitude and polarity of which are controlled by the phase relation between the signals applied to it, and this phase will be seen to depend in turn upon the position, in a direction perpendicular the direction of line scanning, of the line currently being scanned. The output from phase comparator 38 is thus a measure of the departure of the line being scanned from that position in which the signals derived from photocells 28 and 29 are of the same phase. In the present system this signal is applied to vertical scan generator 13 so as to correct in known manner any error in its output. Such an arrangement will restore a line to its correct position, but this position can only be that in which the signals from photocells 28 and 29 have a predetermined relation, which is most conveniently that they differ in phase by 90°.

In the majority of applications of this feature of the invention it will be desired to control the position of each of a number of successively scanned and adjacent lines. The phase relation between the signals derived from photocell 29 and from photocell 28 must therefore be different from one line to the next, so that it becomes necessary to make provision for introducing an appropriate phase shift in one of the signals applied to phase comparator 38.

In the embodiment illustrated in Figure 1 this function is performed by phase shifter 36 which is arranged to provide signals from amplifier 34 delayed by different appropriate amounts, according to the condition of a counter unit 40 which is stepped from one stable state to the next by signals derived from the line-scan generator 12 at the end of each scanned line. Counter 40 responds to these signals by assuming each in turn of an appropriate number of stable conditions and in so doing changes the output from phase shifter 36 from the phase appropriate to one line to that appropriate to the next.

The signal derived by phase comparator 38 as a result of comparing the signal from cell 29 with a signal selected by phase shifter 36 under the control of counter 40 is utilized to produce any necessary correction to the current passed by scan generator 13, which controls the component of deflection perpendicular to the direction of line scanning.

Obviously the nature of phase-shifting circuits forming part of phase shifter 36 must be adapted to the nature of the signals applied to the unit; a simple arrangement, such as a tapped delay line, may be used.

The operation of the control system illustrated in Figure 1 will now be further described with reference to Figures 2 to 6.

Figure 2 shows a portion of raster 42 traced on the luminescent screen 41 of cathode-ray tube 10. The screen is impacted by a generated beam to trace the adjacent luminous lines 43. An image of raster 42 is projected upon utilization area 21 for whatever purpose it is required; this purpose forms no part of the present invention which in this aspect is concerned only with meeting a requirement for producing a very accurately controlled raster. Raster 42 is also imaged upon field 26, as illustrated in Figure 3, which shows this field 26 as "seen" by photocell 28. Field 26 consists of the alternate opaque strips 30 and equal intervening areas 31, as hereinbefore described, through which the image of the raster 42 appears. The output signal from photocell 28 when line 43 is scanned, thus comprises an approximate square-wave which is shown in an idealized form as wave form 28A in Figure 5.

In the portion of field 27 as illustrated in Figure 4, it is noted that the angle $\theta$ is equal to 45°. Since the line pitch is equal to one picture point, this yields equal control sensitivities in both directions and may be considered the usual arrangement.

Waveform 28A in Figure 5 represents the signal from photocell 28 of Figure 1, during the scanning of line 43 by the scanning beam after comparator 35 has brought the scanning process into phase-synchronism with reference signal 37, which is represented as a sinusoidal signal. It is not necessary that reference signal 37 be sinusoidal or, indeed, that it should have a constant periodicity, since the invention is applicable in systems in which the speed of the scanning beam or spot is required to vary in a predetermined manner under the control of a received signal. However, the most usual requirement will be to produce a scan in which the scanning element moves with a uniform velocity determined by a signal derived from a constant-frequency sinusoidal oscillator along each line scanned and it is a system of this kind which will be further considered below.

The operation of the described system in correcting errors in the position of the scanned line will now be considered.

If a scanning beam required to traverse line 43 were, owing to inaccuracy in vertical scan generator 13, to commence to traverse the scanned field at an incorrect position not excessively removed from its true position the signal derived as a result of its traversal across field 27 would be incorrectly phased with respect to that derived by the scanning beam traversing field 26, and phase comparator 38 would operate to correct the inaccuracy. The extent of the phase difference is illustrated in Figure 6. It will be seen from this figure that if a line is initially displaced within the limits of a ±3.75 line widths, the operation of the control system will restore it to its correct position. An initial error exceeding this tolerance would be liable to cause the line to be brought to an incorrect position. If the intrinsic accuracy of the scan generator controlling the line position is not sufficient to assure this initial accuracy, then a smaller phase change between adjacent lines must be adopted by reducing the slope of the strips 32 forming the field 27. This will produce a consequent increase in the allowable initial inaccuracy, which however is inevitably accompanied by a corresponding decrease in the accuracy with which the line is held in its required position, unless the phase-sensitivity of the phase comparator 38 is correspondingly increased.

The effective width of the strips forming fields 26 and 27, and the inclination of those in the latter will be seen to control firstly, the accuracy with which a desired linear velocity can be obtained and secondly, the phase shift between any line and its neighbour. Where the bar and space widths are each equal to $n$ picture points and the line pitch is equal to $p$ picture points, then the angle of inclination $\theta$ of the bars of field 27 which is necessary to obtain a desired phase change $\phi$ between adjacent lines is given by the formula $$\theta = \tan^{-1} \frac{360p}{2n\phi}$$

In the embodiment illustrated, $\phi$ is chosen as 45° since this yields equal control sensitivity in the two directions of scanning, $n=4$ and $p=1$, so that $$\theta = \tan^{-1} \frac{360 \times 1}{2.4.45°} = \tan^{-1} 1 = 45°$$

Where the number of lines included in a single traversal of the second field is not an integral multiple of the scaling factor of counter 40 an appropriate correcting signal must be fed to counter 40 during the retrace period of scan generator 13.

Where an interlaced scan is to be generated, this may conveniently be done by arranging that counter 40 is stepped twice each time the line scan generator 12 reaches the end of a scanned line and that an appropriate correcting signal is, if necessary, applied to it during the retrace period of scan generator 12 to select the required phase for the first line of the next raster.

If it is required to produce a scan in which the lines are inclined to the direction of deflection, this may be effected by arranging that one of the signals applied to comparator 35 undergoes a progressive phase change during the scanning of each line, so that the position of the scanning beam in the direction perpendicular to that of line scanning is continuously varied.

According to the alternative embodiment of the invention as shown in Figure 7, fields 26 and 27 comprise sets of strips which are inclined to the direction of line scanning at equal but opposite angles. The use of this feature introduces the advantage that a single master pattern may be employed to produce both comparison fields, with a resultant decrease in cost and increase in accuracy.

In this case where the strips in the two fields 44, 45, are inclined equally but oppositely to the direction of the scanned lines an advantage arises in that the signals derived from the two fields are of identical waveform. Each signal, however, will now contain information as to the position of the scanning element in each of two directions, since it is obvious that any change in the speed of traversal of the scanning element along a line will yield equal changes in the periodicity of each of the derived signals, while a change in the position of the scanned line will produce equal but opposite changes in the phases of the derived signals. It is therefore necessary to combine the two sets of information and to derive from the combination the two error signals which are required. With reference then, to Figure 7, signals from photocells 28, 29 are again amplified by amplifiers 34, 39, but the signals from each amplifier are now applied to variable phase-shifting devices 48, 49 which are equally and oppositely controlled by counter 40 so that when the correct line is being scanned the phase difference in their output signals amounts to 90°.

The signals from phase-shifters 48, 49 are fed to a ring modulator circuit 50 comprising transformers 51, 52 and a diode ring 53, which yields between leads 54, 55 a signal comprising components having frequencies which are, respectively, the sum and difference of frequencies of the signals applied to modulator 50. If the apparatus is operating correctly the two applied signals will be of the same frequency so that one output component will be of zero frequency, i.e. it will be a direct voltage, the magnitude and polarity of which changes with any change in the phase relation (normally 90°) of the applied signals. The sum component will be independent of the position of the line and will be of twice the basic frequency corresponding to the traversal of the scanning beam over the field pattern.

The zero-frequency component is separated by a low-pass filter comprising a series inductor 56 and shunt capacitor 57 and taken via terminals 58, 59 to correct the operation of scan generator 13 which controls the traversal of the scanning spot in the direction perpendicular to that of line scanning.

The higher-frequency sum component of the signal is taken by way of the high-pass filter comprising the series capacitor 68 and a shunt inductor 67 formed by the primary winding of a transformer 62, which with the transformer 63 and diode ring 61 forms the second ring modulator circuit 60. The master signal 64, of appropriate frequency, is received at terminals 65, 66 and applied to transformer 63. The second ring modulator 60 thus yields at terminals 69, 70, a low-frequency signal representing the deviation of the signal applied to transformer 62 from a 90° phase relation to master signal 64 received at terminals 65, 66. This signal may therefore be applied to scan generator 12, which controls the traversal of the scanning beam in the line direction, to correct any error in the speed of traversal of the scanning beam along the line.

While the present invention is most readily applied and has its chief application in systems where a scanning element is required to traverse a rectangular area in a succession of parallel lines substantially parallel to one margin of the area, the invention is not limited to systems of this kind but may be used to cause a scanning element to traverse any pattern of which the lines do not intersect and some patterns in which the lines do intersect. For example, the use of a field consisting of a radial array of alternate transparent and opaque sectors of equal angular width and a second field comprising bars edged by equi-angular spirals displaced by appropriate angles, provides an arrangement permitting a desired circular or spiral trace to be accurately traversed when a signal of constant or linearly varying repetition rate is utilized as a reference signal in place of the herein described signal 37.

Many other types of traversal of an area may be produced either by varying the nature of the control signal utilized in place of reference signal 37 or by altering the phase shift introduced by phase shifter 36. Enough has already been said to indicate the nature of the variations thus possible and to enable those skilled in the art to select appropriate conditions for producing any desired pattern of traversal.

The present invention has been described in relation to an embodiment employing the cathode-ray flying spot method of scanning, but it will be appreciated that it might also be applied, though with less simplicity, to systems in which an electron beam scans a desired area directly. In such an embodiment use might be made of two additional electron beams subjected to identical deflecting fields and arranged to scan areas comprising appropriate patterns of differing secondary emissivity. In a case where the absolute intensity of an electron beam scanning an area is not of importance it might be arranged that the beam, before reaching its true target, passed through electrode systems in which appropriate areas intercepted some of the beam electrons to yield the necessary signals.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A scanning control system comprising: means for generating a beam of radiant energy; first deflecting means responsive to a first scanning signal for displacing said beam in a first coordinate scanning direction at a predetermined first scanning frequency; second deflecting means responsive to a second scanning signal for displacing said beam in a second coordinate scanning direction at a predetermined second scanning frequency; first and second scanning signal generators respectively coupled to said first and second deflecting means for causing coordinate scanning of said beam; means for splitting said beam into a primary beam and a pair of divergent secondary beams; first and second field elements respectively interposed in the paths of said secondary beams and each comprising a plurality of spaced opaque strips with intervening translucent areas of equal width measured in said first coordinate direction, the opaque strips of said second field element being obliquely oriented relative to those of said first field element; first and second pick-up devices respectively associated with said first and second field elements and responsive to secondary beam components translated through said translucent areas for generating respective first and second output signals; a source of reference signal proportional to said predetermined first scanning frequency; means coupled to at least one of said pick-up devices and to said reference signal source for developing a first control signal representative of deviations of the scansion of said beam in said first coordinate direction from said first predetermined scanning frequency; a phase comparator coupled to said pick-up devices and responsive to phase variations between said first and second output signals for developing a second control signal representative of deviations of the scansion of said beam in said second coordinate direction from said predetermined second scanning frequency; and means for applying said first and second control signals to said first and second scanning signal generators, respectively, to correct deviations of said scansion in both of said coordinate directions.

2. A scanning control system comprising: means for generating a beam of radiant energy; first deflecting means responsive to a first scanning signal for displacing said beam in a first coordinate scanning direction; second deflecting means responsive to a second scanning signal for displacing said beam in a second coordinate scanning direction; first and second scanning signal generators respectively coupled to said first and second deflecting means for causing coordinate scanning of said beam; means for splitting said beam into a primary beam and a pair of divergent secondary beams; first and second field elements respectively interposed in the paths of said secondary beams and each comprising a plurality of spaced opaque strips with intervening translucent areas of equal width measured in said first coordinate direction, said spaced strips of said first field element being oriented relative to said first coordinate scanning direction in a predetermined relationship and said spaced strips of said second field element being obliquely oriented with respect to said spaced strips of said first field element; first and second pick-up devices respectively associated with said first and second field elements and responsive to secondary beam components translated through said translucent areas for generating respective first and second output signals; a source of first reference signal proportional to a predetermined first scanning frequency; comparator means coupled to said first pick-up device and to said first reference signal source for deriving a first control signal representative of deviations from said first scanning frequency of the scansion of said beam in said first coordinate direction; phase shifting means, including scaling means coupled to said first scanning signal generator, coupled to said first pick-up device for developing a second reference signal having a phase variation corresponding to a second predetermined frequency; phase comparator means coupled to said second pick-up device and to said phase shifting means for deriving a second control signal representative of deviations from said second scanning frequency of the scansion of said beam in said second coordinate direction; and means for applying said first and second control signals to said first and second scanning signal generators, respectively, to correct deviations of said scansion in both of said coordinate directions.

3. A scanning control system comprising: means for generating a beam of radiant energy; first deflecting means responsive to a first scanning signal for displacing said beam in a first coordinate scanning direction; second deflecting means responsive to a second scanning signal for displacing said beam in a second coordinate scanning direction; first and second scanning signal generators respectively coupled to said first and second deflecting means for causing coordinate scanning of said beam; means for splitting said beam into a primary beam and a pair of divergent secondary beams; first and second field elements respectively interposed in the paths of said secondary beams and each comprising a plurality of spaced opaque strips with intervening translucent areas of equal width measured in said first coordinate direction, said spaced strips of said first field element being obliquely oriented relative to said first coordinate scanning direction, said opaque strips of said second field element likewise obliquely oriented but oppositely with respect to said opaque strips of said first field element; first and second pick-up devices respectively associated with said first and second field elements and responsive to secondary beam components translated through said translucent areas for generating respective first and second output signals; a source of reference signal proportional to a predetermined first scanning frequency; scaling means coupled to said first scanning signal generator; first and second phase shifting means responsive to said first and second output signals, respectively, and coupled to said scaling means for developing a pair of information signals; a modulator circuit responsive to said information signals and including means for yielding a plurality of signal components; first selection means at least partially responsive to said signal components for deriving a comparison signal; additional modulator means responsive to said comparison signal and to said reference signal for developing a first control signal representative of deviations of the scansion of said beam in said first coordinate direction from said first scanning frequency; second selection means likewise partially responsive to said signal components for developing a second control signal representative of deviations of the scansion of said beam in said second coordinate direction from said second scanning frequency; and means for applying said first and second control signals to said first and second scanning signal generators respectively to correct deviations of said scansion in both of said coordinate directions.

4. A scanning control system in accordance with claim 2 in which said first pick-up device develops a control signal of frequency proportional to the velocity of said beam and said first coordinate scanning direction, and said second pick-up device develops a second control signal of phase proportional to the position of said beam in said second coordinate scanning direction.

5. A scanning control system in accordance with claim 2 in which said first and second coordinate scanning directions comprise horizontal and vertical scanning directions, respectively.

6. A scanning control system in accordance with claim 2 in which said first field element is perpendicularly oriented with respect to said first scanning direction.

7. A scanning control system in accordance with claim 2 in which said second field element comprises spaced strips of width equal to the strips of said first field element multiplied by the cosine of the angle between said second field element strips and said first coordinate scanning direction.

8. A scanning control system in accordance with claim 3 in which said comparison signal comprises a signal of frequency comprising the sum of the frequencies of said pair of information signals; and said second control signal comprises a signal of frequency comprising the difference of the frequencies of said pair of information signals.

9. A scanning control system in accordance with claim 3 in which said first selection means comprises a high-pass filter and said second selection means comprises a low-pass filter.

References Cited in the file of this patent

UNITED STATES PATENTS

| | | |
|---|---|---|
| 2,415,191 | Rajchman | Feb. 4, 1947 |
| 2,476,698 | Clapp | July 19, 1949 |
| 2,611,816 | Darke | Sept. 23, 1952 |